US010526250B2

(12) United States Patent
Engler et al.

(10) Patent No.: US 10,526,250 B2
(45) Date of Patent: *Jan. 7, 2020

(54) BORON NITRIDE AGGLOMERATES, METHOD OF PRODUCTION THEREOF AND USE THEREOF

(71) Applicant: 3M INNOVATIVE PROPERTIES COMPANY, St. Paul, MN (US)

(72) Inventors: Martin Engler, Kempten (DE); Krishna Uibel, Waltenhofen (DE); Jens Eichler, Kempten (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,138

(22) Filed: Nov. 27, 2018

(65) Prior Publication Data

US 2019/0092694 A1    Mar. 28, 2019

Related U.S. Application Data

(63) Continuation of application No. 15/215,886, filed on Jul. 21, 2016, now Pat. No. 10,173,931, which is a
(Continued)

(30) Foreign Application Priority Data

Nov. 10, 2010    (DE) .................. 10 2010 050 900

(51) Int. Cl.
  *C04B 35/583*    (2006.01)
  *C01B 21/064*    (2006.01)
  (Continued)

(52) U.S. Cl.
  CPC .......... *C04B 35/583* (2013.01); *C01B 21/064* (2013.01); *C01B 21/0648* (2013.01);
  (Continued)

(58) Field of Classification Search
  CPC ....... E04D 2001/005; E04D 1/26; E04D 5/10; G02B 5/128; D06N 5/00; B82Y 30/00;
  (Continued)

(56) References Cited

U.S. PATENT DOCUMENTS 5,854,155 A     12/1998  Kawasaki et al.
5,898,009 A *    4/1999  Shaffer ............... C04B 35/5831
                                                          423/290
(Continued)

FOREIGN PATENT DOCUMENTS

CN       101535175 A       9/2009
EP       0 939 066         9/1999
                (Continued)

OTHER PUBLICATIONS

Chinese Paten Application No. 201180054277.7, Search Report dated Mar. 17, 2014, six (6) Pages.
(Continued)

*Primary Examiner* — Tahseen Khan
(74) *Attorney, Agent, or Firm* — Nath, Golberg & Meyer; Tanya E. Harkins; Joshua B. Goldberg

(57) ABSTRACT

The invention relates to boron nitride agglomerates, comprising lamellar, hexagonal boron nitride primary particles, which are agglomerated with one another with a preferred orientation, the agglomerates formed being flake-shaped.
The invention also relates to a method for producing said boron nitride agglomerates, characterized in that lamellar, hexagonal boron nitride primary particles are agglomerated in such a way that they line up with one another with a preferred orientation.
The flake-shaped agglomerates according to the invention are suitable as filler for polymers for making polymer-boron nitride composites and for hot pressing of boron nitride sintered compacts.

1 Claim, 7 Drawing Sheets

Related U.S. Application Data continuation of application No. 12/964,195, filed on Dec. 9, 2010, now Pat. No. 9,422,200.

(51) Int. Cl.
| | | |
|---|---|---|
| *C04B 35/626* | (2006.01) | |
| *C04B 35/628* | (2006.01) | |
| *C04B 35/645* | (2006.01) | |
| *C08K 3/28* | (2006.01) | |
| *C09K 5/14* | (2006.01) | |

(52) U.S. Cl.
CPC ........ *C04B 35/628* (2013.01); *C04B 35/6261* (2013.01); *C04B 35/62675* (2013.01); *C04B 35/62695* (2013.01); *C04B 35/645* (2013.01); *C08K 3/28* (2013.01); *C09K 5/14* (2013.01); *C01P 2004/03* (2013.01); *C01P 2004/50* (2013.01); *C01P 2004/51* (2013.01); *C01P 2004/61* (2013.01); *C04B 2235/3217* (2013.01); *C04B 2235/3218* (2013.01); *C04B 2235/3409* (2013.01); *C04B 2235/3418* (2013.01); *C04B 2235/3865* (2013.01); *C04B 2235/5292* (2013.01); *C04B 2235/549* (2013.01); *C04B 2235/5427* (2013.01); *C04B 2235/5436* (2013.01); *C04B 2235/5463* (2013.01); *C04B 2235/5481* (2013.01); *C04B 2235/767* (2013.01); *C04B 2235/77* (2013.01); *C04B 2235/787* (2013.01); *C04B 2235/788* (2013.01); *C04B 2235/96* (2013.01); *C04B 2235/9607* (2013.01); *Y10T 428/24372* (2015.01); *Y10T 428/25* (2015.01); *Y10T 428/2982* (2015.01)

(58) Field of Classification Search
CPC ........ C08J 3/12; C01P 2004/62; G11B 5/735; G11B 5/738; G11B 21/064; G11B 35/5831; G11B 35/583
USPC .......... 428/220, 402, 323; 264/113; 423/290
See application file for complete search history.

(56) References Cited

U.S. PATENT DOCUMENTS

| | | | |
|---|---|---|---|
| 5,958,794 A | 9/1999 | Bruxvoort et al. | |
| 6,048,511 A | 4/2000 | Shaffer et al. | |
| 6,096,671 A | 8/2000 | Kawasaki et al. | |
| 6,645,612 B2 | 11/2003 | Pujari et al. | |
| 7,132,164 B2* | 11/2006 | Yamazaki | G11B 5/70678 428/402 |
| 7,189,774 B2 | 3/2007 | Clere | |
| 7,381,482 B2* | 6/2008 | Yamazaki | B82Y 30/00 428/402 |
| 2002/0006373 A1 | 1/2002 | Clere | |
| 2003/0153665 A1 | 8/2003 | Tobita et al. | |
| 2004/0208812 A1* | 10/2004 | Clere | C01B 21/0648 423/284 |
| 2006/0099406 A1 | 5/2006 | Norley et al. | |
| 2006/0127422 A1* | 6/2006 | Lodyga | C04B 35/58007 424/400 |
| 2006/0160476 A1 | 7/2006 | Bright et al. | |
| 2007/0142203 A1* | 6/2007 | Malenfant | B82Y 30/00 501/88 |
| 2007/0259211 A1* | 11/2007 | Wang | H01L 23/3737 428/698 |

FOREIGN PATENT DOCUMENTS

| | | |
|---|---|---|
| EP | 2 436 662 A1 | 4/2012 |
| JP | H02-192467 | 7/1990 |
| JP | 2001172604 A | 6/2001 |
| JP | 2010001402 A | 1/2010 |
| JP | 2010515807 A | 5/2010 |
| WO | 03/013845 | 2/2003 |
| WO | 2005/021428 | 3/2005 |
| WO | 2008/085999 | 7/2008 |
| WO | 2009116357 A1 | 9/2009 |
| WO | 2010/137440 A1 | 12/2012 |

OTHER PUBLICATIONS

Morgan, et al., "Ceramic Processing of Boron Nitride Insulators," Oak Ridge National Library, (1977), XP-002667909, eight (8) pages.

Ng, et al., "Thermal Conductivity of Boron Nitride-Filled Thermoplastics: Effect of Filler Characteristics and Composite Processing Conditions," Polymer Composites, (2005), pp. 778-790.

China Material Engineering Canon: vol. 8, Inorganic Non-Metallic Material Engineering (I), edited by Dongliang Jiang et al., Chemical Industry Press, first edition in Mar. 2006, pp. 166-167, Mar. 31, 2006.

Practical Refractory Raw Material Handbook, edited by Haizhu Guo et al., China Building Materials Press, first edition in Sep. 2000, pp. 472-473, Sep. 30, 2000.

* cited by examiner

BORON NITRIDE AGGLOMERATES, METHOD OF PRODUCTION THEREOF AND USE THEREOF

This is a Continuation Application of U.S. patent application Ser. No. 15/215,886 filed on Jul. 21, 2016, a Continuation Application of U.S. patent application Ser. No. 12/964,195, filed Dec. 9, 2010, an application claiming the benefit from German Application No. 102010050900.0, filed Nov. 10, 2010, the contents of each of which are hereby incorporated by reference in their entirety.

FIELD OF THE INVENTION

The present invention relates to boron nitride agglomerates, comprising lamellar, hexagonal boron nitride, a method of production thereof and the use of said agglomerates as filler for polymers and for the hot pressing of boron nitride sintered compacts.

BACKGROUND OF THE INVENTION

Hexagonal boron nitride powder can, owing to its good thermal conductivity, be used as filler for polymers in applications simultaneously requiring good electrical insulation capability of the filler used. Furthermore, boron nitride powder is also used as sintering powder for hot pressing, for applications in metallurgy. Moreover, hexagonal boron nitride powder is used in cosmetic preparations, as a lubricant, as a parting compound in metallurgy and as raw material for the production of cubic boron nitride.

Hexagonal boron nitride powder is synthesized industrially by nitriding boric acid in the presence of a source of nitrogen. Ammonia can be used as the source of nitrogen, and then usually calcium phosphate is used as the carrier material for the boric acid. An organic source of nitrogen such as melamine or urea can also be reacted under nitrogen with boric acid or borates. Nitriding is usually carried out at temperatures from 800 to 1200° C. The boron nitride then obtained is largely. amorphous, and it is also called turbostratic boron nitride. Hexagonal, crystalline boron nitride is produced from amorphous boron nitride at higher temperatures up to about 2100° C. preferably in a nitrogen atmosphere. For this high-temperature treatment, crystallization additives are also added to the amorphous boron nitride.

In the high-temperature treatment, hexagonal boron nitride (hBN) is formed, as primary particles with lamellar morphology. Typical sizes of the lamellae are in the range from approx. 1 to 20 µm, but sizes of the lamellae up to 50 µm or more are also possible. Usually the heat-treated product is ground or deagglomerated after production, to obtain processable powder.

The thermal conductivity of hexagonal boron nitride is greater in the plane of the lamella (a-axis) than perpendicular to it (c-axis). In the direction of the c-axis the thermal conductivity is 2.0 W/mK, but in the direction of the a-axis it is 400 W/mK (see R. F. Hill, SMTA National Symposium "Emerging packaging Technologies", Research Triangle Park, N.C., Nov. 18-21, 1996).

As well as lamellar boron nitride primary particles or agglomerates of said primary particles, which are formed in the synthesis of hexagonal boron nitride, hexagonal boron nitride powder for uses as filler are also often used in the form of specially produced granules, i.e. in the form of secondary particles formed from the primary particles. Granulation improves the processing properties, such as the free-flowing properties and metering properties, of the boron nitride powder, and higher degrees of filling and higher thermal conductivities can be achieved for example in polymer-boron nitride composites. There are various methods for production of these secondary particles, giving granules with varying morphology and varying properties.

The specially produced granules are often also called "agglomerates", just as for the agglomerates or aggregates produced in the synthesis of hexagonal boron nitride.

PRIOR ART

Known methods for the production of granules are pelletization and spray granulation. The starting point in spray granulation is a suspension of solid in a liquid, which is atomized to droplets and these are then dried. In pelletization, a small amount of liquid is added to the solid, and because of surface wetting and capillary forces this leads to agglomeration of the solid primary particles, and the agglomerates are then dried. Binders are usually employed in both methods. Secondary particles of low density and/or high porosity are obtained in both methods.

US 2006/0 127 422 A1 describes a method for producing spherical boron nitride agglomerates, in which lamellar hexagonal boron nitride is spray-dried from an aqueous suspension with an organic binder. Spray-drying leads to spherical boron nitride granules with an average agglomerate size from 1 to 500 µm. In contrast to the starting powder, the sprayed granules are flowable.

WO 03/013 845 A1 describes a method for producing spherical boron nitride granules, in which primary particles of hexagonal boron nitride, with addition of polycarboxylic acids, silanes or organometallic compounds, are spray-dried and the sprayed granules obtained are then sintered at temperatures between 1800 and 2400° C.

A disadvantage in the methods of granulation of boron nitride by spray-drying is that it is necessary to use binders, and the organic binders used for the spray-drying must be adapted to the particular system for further processing as filler for polymers. The granules obtained in spray-drying are of low density, and when used as filler for thermoplastics the agglomerates may disintegrate completely.

One possibility for making boron nitride granules of high density is the comminution of hot-pressed boron nitride. This results in granules of high density, corresponding to the density of the hot-pressed compacts. However, a disadvantage in this method is that it is first necessary to produce hot-pressed boron nitride articles at temperatures of about 1800° C. and at an axial compaction pressure of typically 20 MPa from boron nitride powder (i.e. from boron nitride primary particles), which is a laborious and expensive process. The subsequent process step of special comminution of the hot-pressed articles is also expensive.

Another method for producing boron nitride granules for use as filler is described in U.S. Pat. No. 6,048,511 and EP 0 939 066 A1. In this, hexagonal boron nitride powder is processed into particles, the size distribution of which ranges over a minimum size range of 100 µm, the ground hBN powder is compacted cold, then granules are produced from the cold-compacted material by disintegration, and finally the resultant granules are sieved, to obtain agglomerates with a desired size range. By multiple repetition of the steps of disintegration and cold pressing, material can be compacted with a density of up to 1.91 g/cm³, from which granules are produced by disintegration. This method has the disadvantage that it is very expensive, as it is first necessary to obtain a special size distribution of the starting powder, and then several steps of compaction and comminution are required.

In US 2002/0 006 373 A1, briquettes of agglomerated boron nitride lamellae, which are formed in the production of hexagonal boron nitride during high-temperature treatment under nitrogen at 1400 to 2300° C., are ground, forming a powder, which contains agglomerates of hexagonal boron nitride and non-agglomerated boron nitride platelets, and then the non-agglomerated platelets are removed, giving a powder consisting of agglomerates of hexagonal boron nitride platelets with a size distribution of the agglomerates from 10 to 125 μm.

US 2004/0 208 812 A1 describes a method for producing a boron nitride powder containing boron nitride agglomerates, in which hexagonal boron nitride with an average platelet size of at least 2 μm is compacted to green compacts, the green compacts are then sintered at temperatures above 1400° C. up to densities from 1.4 to g/cm$^3$ and the sintered compacts obtained are then ground.

WO 2005/021 428 A1 describes a method for producing boron nitride agglomerates of low and medium density, in which turbostratic or hexagonal boron nitride powder with a maximum particle size of 5 μm is heat-treated above 1400° C., preferably at 1850 to 1900° C., and is then ground. Before the thermal treatment, the boron nitride powder can be compressed isostatically into compacts and can be ground.

The resultant agglomerates are spherical to cube-shaped and the agglomerates have isotropic properties, i.e. the primary particles are unoriented in the agglomerates.

U.S. Pat. Nos. 5,854,155 and 6,096,671 describe a method for producing aggregated lamellar boron nitride particles, in which the boron nitride lamellae are unoriented in the aggregates, i.e. they do not have a preferred direction, and they are bound together without binder. The boron nitride aggregates are pinecone-shaped, and are already formed during synthesis of the hexagonal boron nitride from boric acid, melamine and crystallization catalyst. These aggregates are of very low density and they only have slight mechanical stability.

A common feature of the methods described so far for producing boron nitride granules is that they all consist of unoriented lamellar boron nitride particles. For use as a filler for increasing the thermal conductivity of polymers, the lamellar shape of hexagonal boron nitride is a disadvantage (as described above for example in WO 03/013845 A1 on page 2). The small primary particle size and the often associated high specific surface of the hexagonal boron nitride powder limit the possibilities for processing and application. The processing properties can be improved by producing isotropic agglomerates with unoriented hBN lamellae.

When using boron nitride powder as filler for polymers, the aim is to achieve the highest possible thermal conductivity for the polymer-boron nitride composites, so that any heat produced can be removed as well as possible. For a particular value to be achieved for the thermal conductivity of the polymer-boron nitride composite, the degree of filling, and thus the amount of boron nitride to be used, should be as small as possible.

If now the boron nitride primary particles in the polymer-boron nitride composite are oriented isotropically, i.e. they have no preferred orientation, the good thermal conductivity of boron nitride in the plane of the lamella ("in-plane") cannot be fully utilized, as heat conduction in such a material is admittedly often in the plane of the lamella, but it also often takes place perpendicularly to the plane of the lamella of hexagonal boron nitride. Now if isotropic boron nitride agglomerates are used for making said composites, in which the primary particles in the agglomerates are not oriented, the distribution of the boron nitride primary particles in the polymer-boron nitride composites is also isotropic and the good thermal conductivity of boron nitride in the plane of the lamella cannot be utilized optimally.

As well as the production of granules, other ways have been described for increasing the thermal conductivity of boron nitride-filled polymers.

For example, US 2003/0 153 665 A1 describes a method in which a magnetic field is applied to a polymer blend containing hexagonal boron nitride powder, as a result of which the boron nitride lamellae of the hexagonal boron nitride powder are oriented in a particular direction, and then the polymer blend with the oriented boron nitride powder is cured. In this way it is possible to obtain filled polymers with increased thermal conductivity in the direction of orientation of the boron nitride lamellae. There is the disadvantage, however, that an external magnetic field is required for orientation of the boron nitride lamellae.

In WO 2008/085 999 A1, a polymer material filled with boron nitride is produced, in which hexagonal boron nitride is mixed with a polymer and is cured with introduction of force, for example by extrusion, so that the boron nitride lamellae are aligned. In the example, several specimens obtained in this way with a thickness of 1 mm are stacked on top of one another and hot-pressed at 130° C. Disks are machined from the resultant compact, perpendicularly to the direction of orientation of the boron nitride lamellae. The through-plane thermal conductivity measured on the resultant disks is higher than that of the compact produced originally. However, the specimens must always be removed perpendicularly to the direction of orientation of the boron nitride lamellae, so that the method is expensive and cannot be used for all applications. For example, the method is only suitable for thermoplastics, but not for thermosets or pastes.

THE TASK OF THE INVENTION

The invention is therefore based on the task of overcoming the drawbacks of the prior art and making available boron nitride agglomerates of high density, with which the anisotropic properties of hexagonal boron nitride can be better utilized, in particular for applications as filler for polymers.

Furthermore, the invention is based on the task of. making available a cost-effective, simple method for producing boron nitride agglomerates of high density.

SUMMARY OF THE INVENTION

The above task is achieved according to the invention with boron nitride agglomerates according to claim 1, a method for producing said boron nitride agglomerates and a polymer-boron nitride composite and a boron nitride sintered compact.

The invention therefore relates to boron nitride agglomerates, comprising lamellar, hexagonal boron nitride primary particles, which are agglomerated together with a preferred orientation, the agglomerates being flake-shaped.

The invention also relates to a method for producing said boron nitride agglomerates, in which lamellar, hexagonal boron nitride primary particles are agglomerated in such a way that they line up with one another with a preferred orientation.

The invention further relates to a polymer-boron nitride composite comprising flake-shaped boron nitride agglomerates according to the invention and a boron nitride sintered compact, obtainable by sintering flake-shaped boron nitride agglomerates according to the invention.

In contrast to the known agglomerates, for which the boron nitride primary particles in the agglomerates are agglomerated with one another largely without preferred orientation, the primary particles in the agglomerates according to the invention have a definite preferred orientation—they are oriented with one another and agglomerated. The boron nitride agglomerates according to the invention can, based on the preferred direction of the boron nitride primary particles, also be designated as textured boron nitride agglomerates.

The boron nitride agglomerates according to the invention are flake-shaped and can, on the basis of their flake shape, also be called "flakes", and the flakes according to the invention are to be differentiated from non-agglomerated lamellar boron nitride primary particles, which are often also called "flaky boron nitrides particles" in the literature in English. The structure of the agglomerates according to the invention is made up of many individual boron nitride lamellae.

In contrast to non-agglomerated boron nitride powders, the agglomerates according to the invention are free-flowing and can be metered easily.

The textured agglomerates according to the invention have a high density, which can even be higher than that of the high-density agglomerates in EP 0 939 066 A1.

Moreover, the agglomerates according to the invention have good mechanical stability, and the mechanical stability can be further improved markedly by thermal treatment of the agglomerates.

Owing to the preferred orientation of the boron nitride primary particles in the agglomerates, in contrast to the known agglomerates, the agglomerates according to the invention have anisotropic properties. In particular, the thermal conductivity is higher in the direction of the diameter of the flakes than in the direction of the thickness of the flakes, because in the direction of the diameter of the flakes, i.e. in the plane of the flake-shaped agglomerates, heat conduction largely takes place in the plane of the lamellae of the boron nitride primary particles, in which the thermal conductivity is higher.

Surprisingly, it was found that agglomerates of high density and with good mechanical stability can be produced by the method according to the invention.

It is also surprising that highly textured boron nitride agglomerates can be produced, in which the boron nitride primary particles are very strongly oriented to one another, in contrast to the known isotropic granules, in which there is hardly any or at best only very slight texturing. The texturing is also markedly greater than in hot-pressed boron nitride.

Compared with the methods known in the prior art for producing boron nitride granules, the method according to the invention has the advantage that it is less expensive, that granules of high density can be produced in just one step and that it is suitable as a continuous process for producing large amounts of boron nitride agglomerates.

Surprisingly, it was also found that the textured boron nitride agglomerates according to the invention can also be used as filler for polymers and high thermal conductivity values are then obtained. This is surprising because up to now the lamellar particle morphology of the primary particles, combined with the anisotropy of the thermal conductivity of the primary particles, was regarded as unfavourable for applications as filler, and this disadvantage could only be overcome by the production and use of isotropic granules.

Owing to the anisotropic properties of the agglomerates according to the invention, the anisotropic thermal conductivity properties of hexagonal boron nitride can be better utilized. Polymers filled with isotropic boron nitride agglomerates having a spherical or cube shape also have isotropic thermal conductivity properties. When using the textured boron nitride agglomerates according to the invention with anisotropic properties, the anisotropy of the thermal conductivity of the polymer-EN composite can be adjusted. If the textured agglomerates with a lamellar shape are used, then for example in injection moulding of the corresponding polymer-boron nitride compounds, say of plates or ribs, on account of wall friction, polymer-boron nitride composites are inevitably obtained with a preferred orientation of the textured boron nitride agglomerates. Polymer-boron nitride composites produced in this way have, with orientation of the agglomerates in the preferred direction, higher thermal conductivity values in the preferred direction ("in-plane" relative to the plane of the lamellae) than perpendicularly to the preferred direction ("through-plane11"). Surprisingly, with these polymer-boron nitride composites it is not only possible to obtain high thermal conductivity values in-plane, but also high thermal conductivity values through-plane.

In contrast to some methods known in the prior art for producing boron nitride granules or agglomerates, with the method according to the invention it is possible to produce binder-free agglomerates.

BRIEF DESCRIPTION OF THE APPENDED DRAWINGS

Figure 1A:
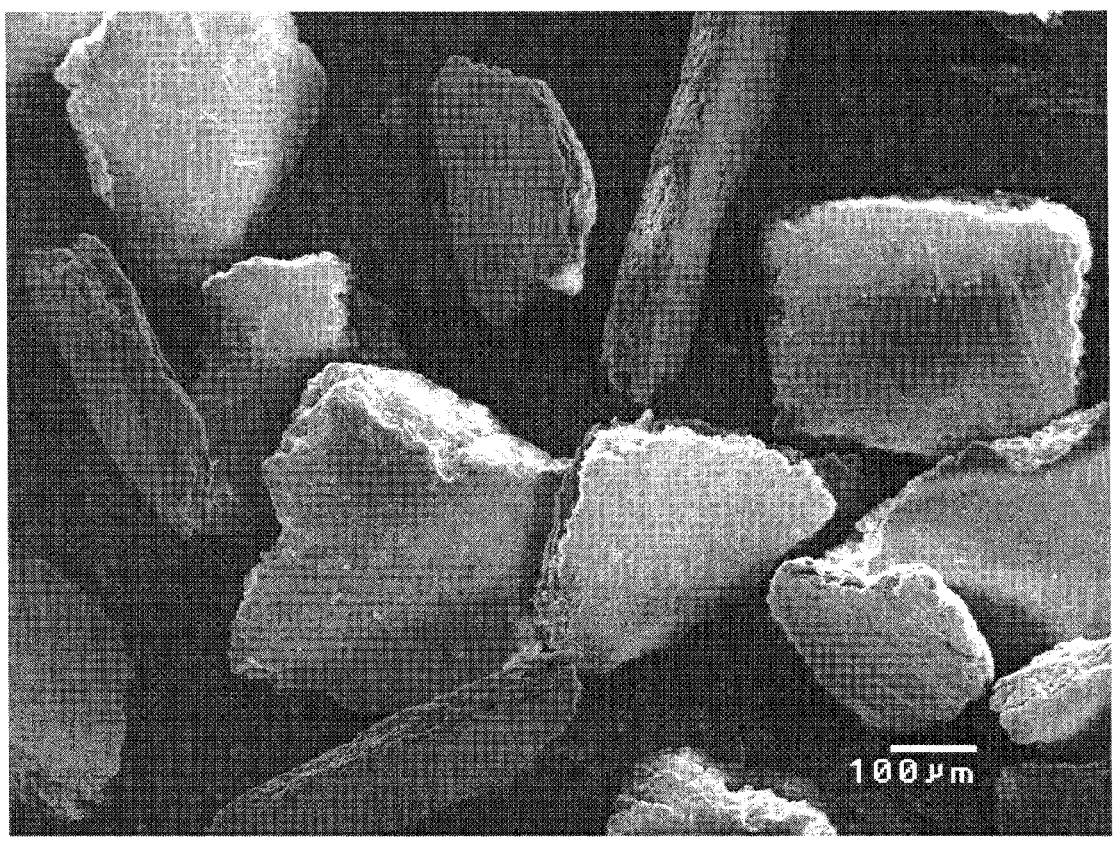
FIG. 1a shows an SEM micrograph of the agglomerates according to the invention with smooth forming surfaces and rough fracture surfaces.
Figure 1B:
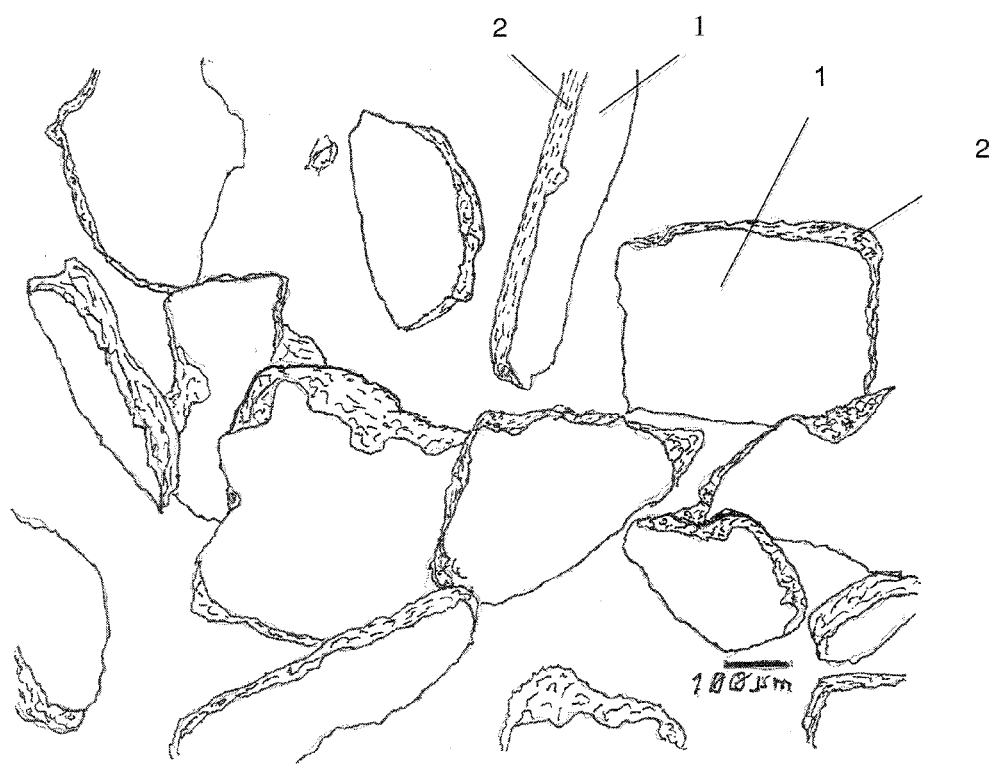
FIG. 1b shows a schematic drawing of the SEMI micrograph in FIG. 1a, with smooth forming surfaces 1 and rough fracture surfaces 2.
Figure 2:
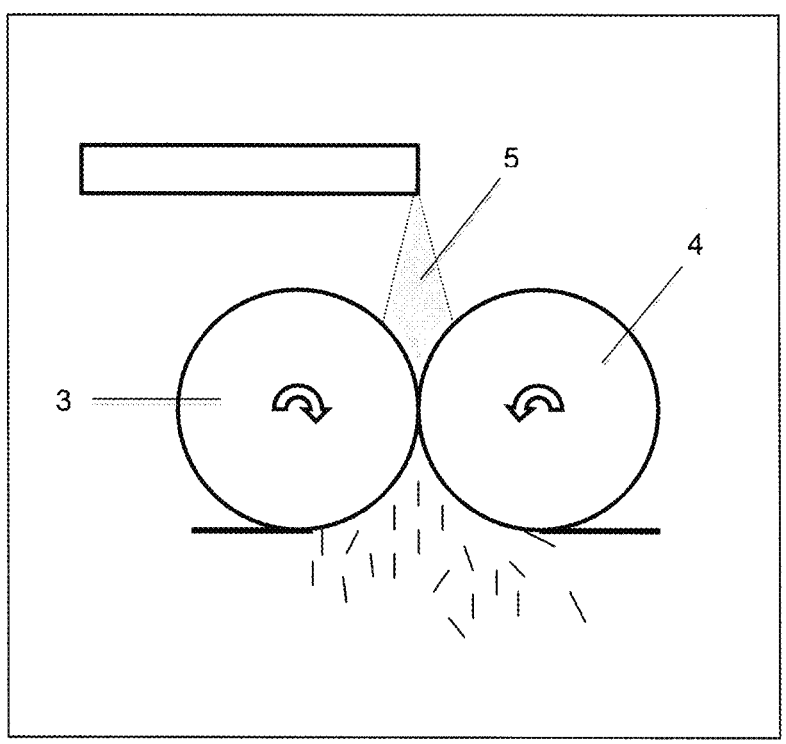
FIG. 2 shows schematically the production of agglomerates according to the invention by compacting between two counterrotating rolls 3, 4 arranged without a gap, where one of the rolls is driven.
Figure 3:
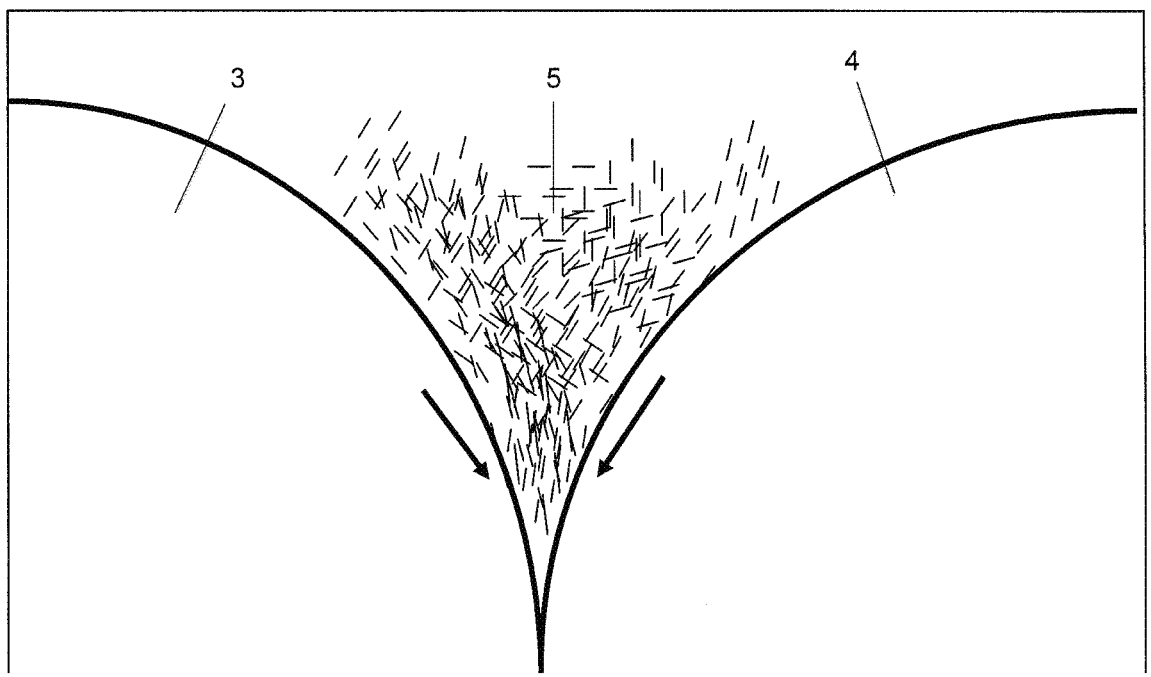
FIG. 3 shows schematically the powder fill 5 above the two rolls 3, 4. The particles to be agglomerated become oriented in a narrow region above the "roll gap".
Figure 4:
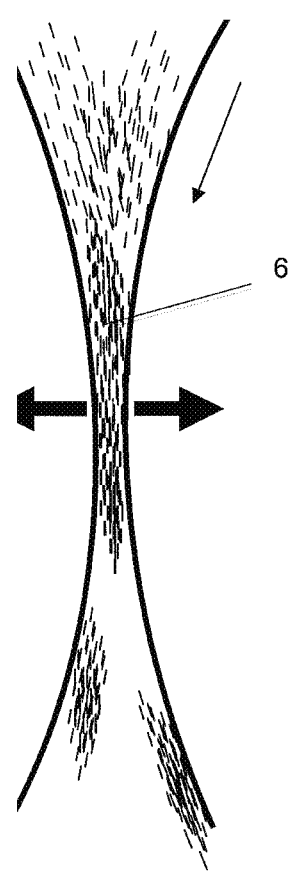

FIG. 4 shows schematically the filled roll gap 6. In the gap 6, the pre-oriented particles become fully oriented and, under the high pressure in the roll gap, are compacted to textured agglomerates of high density. At an agglomerate thickness of for example 50 μm, the textured agglomerates have forced the two rolls apart by 50 μm.

Figure 5:
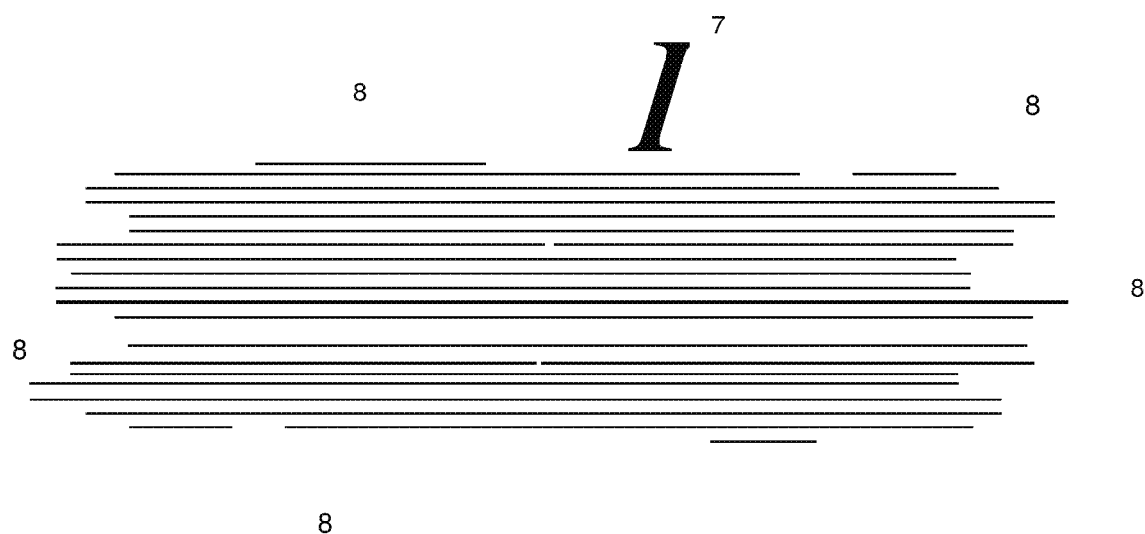

FIG. 5 shows, with a schematic cross-section, the structure of the textured agglomerates 7 according to the invention. Primary particles 8 of hexagonal boron nitride are densely packed and, moreover, are largely oriented parallel to one another, i.e. they have a preferred orientation to one another. The roughness of the forming surface (top and bottom in the schematic drawing) is in the region of the thickness of the primary particles (<1 μm) The roughness of the surfaces of the lateral regions, i.e. the fracture surfaces or edge zones produced during compaction, is in the region of the average primary particle diameters.

Figure 6:
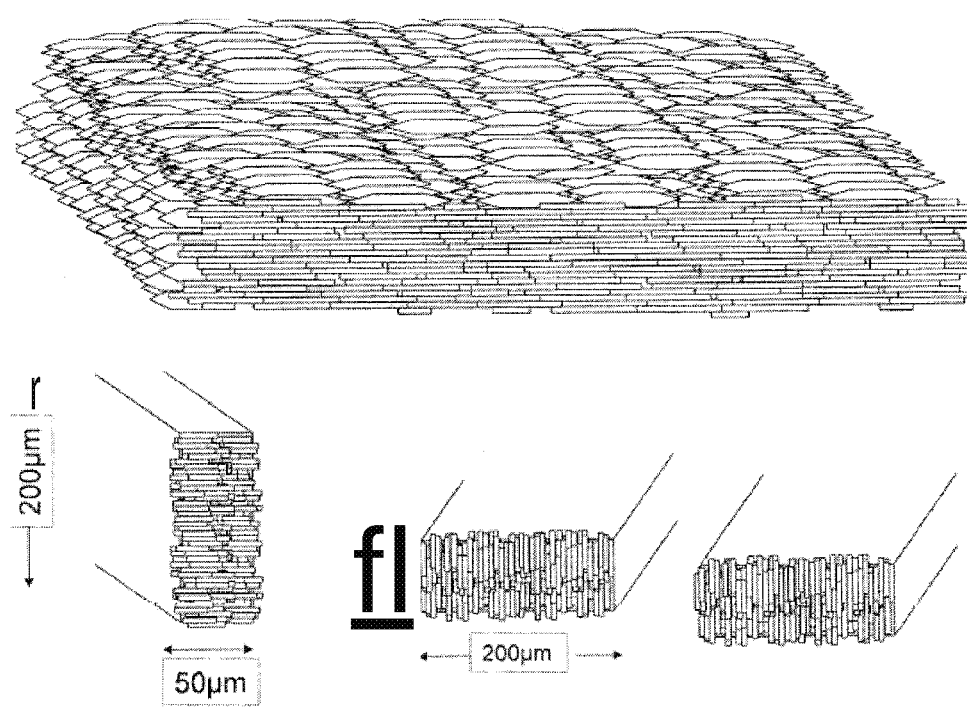

FIG. 6 shows, with a schematic representation, how suitable comminution, e.g. cutting or breaking, of textured boron nitride agglomerates perpendicularly to the forming surface can again produce textured agglomerates, with the orientation of the boron nitride primary particles in the resultant textured agglomerates being reversed or rotated: the orientation of the primary particles in the newly produced agglomerates is no longer parallel, but perpendicular to the main surface of the agglomerates. The textured agglomerates produced in this way can be oriented in polymer-boron nitride composites in the forming process, so that increased through-plane thermal conductivity can be obtained.

DETAILED DESCRIPTION OF THE INVENTION

As already mentioned above, the boron nitride agglomerates according to the invention are agglomerates of lamellar, hexagonal boron nitride primary particles, which have been agglomerated together with a preferred orientation and therefore can also be called oriented or textured agglomerates or granules.

Preferably, the boron nitride primary particles are agglomerated with a preferred orientation in such a way that the planes of the lamellae of the boron nitride primary particles are essentially aligned parallel to one another, i.e. so that the majority of the boron nitride primary particles are oriented parallel or almost parallel to one another.

The degree of orientation of the lamellar boron nitride primary particles in the agglomerates according to the invention can be characterized by the texture index. The texture index of hexagonal boron nitride with isotropic orientation of the lamellar boron nitride primary particles, thus without preferred orientation, has a value of 1. The texture index increases with the degree of orientation in the sample. The texture index of the agglomerates according to the invention has values above 1.5, preferably 2.0 or more, more preferably 2.8 or more, and especially preferably 3.5 or more. The texture index of the agglomerates according to the invention can also have values of 5.0 or more and of 10.0 or more.

The texture index is determined by an X-ray method. For this, the ratio of the intensities of the (002) and of the (100) reflection measured on X-ray diffraction diagrams is determined and is divided by the corresponding ratio for an ideal, untextured hBN sample. This ideal ratio can be determined from the JCPDS data and is 7.29.

The texture index (TI) can therefore be determined from the formula $$TI \frac{I(002), sample/I(100), sample}{I(002), theoretical/I(100), theoretical} \quad \frac{I(002), sample/I(100), sample}{7.29}$$

For the agglomerates according to the invention with a size of about 3.5 cm² (relative to the area of the top or underside of the flake-shaped agglomerates), very high values of 100 or more can be obtained for the texture index. These values measured on the large flake-shaped agglomerates are evidence of the very marked orientation of the primary particles in the agglomerates according to the invention. The texture index for smaller agglomerates, say smaller than 1 mm, is measured on beds of agglomerates. There is then partially random orientation in the sample carrier for the X-ray measurement. Therefore the values obtained on smaller textured agglomerates for the texture index are always lower than corresponds to the orientation of the primary particles in the individual flake-shaped agglomerate.

The agglomerate size of the agglomerates according to the invention can be stated as the sieving fraction, for example as "<350 μm" or "100-200 μm", or as the average agglomerate size ($d_{50}$) determined by measurement of the agglomerate size distribution. The agglomerate size distribution can be measured by laser diffraction (dry measurement, Mastersizer 2000, Malvern, Germany).

The agglomerates according to the invention can have agglomerate sizes of several centimetres. For further processing or use, agglomerate sizes up to about 1 cm are advisable, depending on the particular intended application. For use as filler for polymers, usually the most varied materials are used with agglomerate sizes up to 3 mm, preferably up to 1 mm. More preferably, average agglomerate sizes ($d_{50}$) of up to 500 μm, and more preferably of up to 200 μm are used. The $d_{50}$ value is preferably at least 30 μm. Especially preferably, narrow grain size ranges are used, for example 100 to 300 μm, 1 to 2 mm or 50 to 150 μm.

The flake-shaped agglomerates according to the invention can have a thickness from 10 to 500 μm, preferably from 15 to 350 μm, especially preferably from 30 to 200 μm.

The aspect ratio, i.e. the ratio of agglomerate diameter to agglomerate thickness, of the flake-shaped agglomerates can be determined based on SEM photographs, by measuring the agglomerate diameter and thickness.

The aspect ratio of the flake-shaped agglomerates according to the invention has a value greater than 1, preferably values of 1.5 or more, more preferably values of 2 or more.

The density of the agglomerates according to the invention is preferably 1.6 g/cm³ or more, preferably g/cm³ or more and especially preferably 2.0 g/cm³ or more.

The density of the agglomerates according to the invention can be determined on agglomerates with a size of about 1-5 cm² according to the Archimedes principle as the buoyancy density in water or geometrically on agglomerates produced by cutting with a size of about 1 cm×1 cm.

For use as filler for polymers it is advantageous to use fillers or agglomerates with the lowest possible specific surface (BET), as this minimizes the heat transmission resistances from the filler to the polymer. With the method according to the invention it is possible to produce boron nitride agglomerates with very small specific surface, much smaller than the agglomerates of the prior art.

The textured agglomerates according to the invention have surfaces on their top and underside that are produced directly by the forming process, not by comminution. These surfaces, designated as "forming surfaces", are comparatively smooth, in contrast to the rough lateral surfaces (fracture surfaces) of the agglomerates, which were produced by breaking or by comminution operations. The surfaces of the flake-shaped agglomerates according to the invention are essentially flat (planar) and their top surface and underside are largely parallel to each other.

The proportion of the forming surface in the total surface of the agglomerates according to the invention is, assuming a lamellar or flake shape with round main surface, on average at least 33% (if the diameter of the agglomerates is equal to their height) and, assuming a lamellar or flake shape with square main surface, also at least 33% (for the cube shape) For agglomerates according to the invention with high aspect ratio the proportion of the forming surfaces in the total surface is much higher; for agglomerates with an aspect ratio >3.0 the proportion is usually between 60 and 95%, and for very large agglomerates the proportion can be even higher. By rounding the agglomerates or as a result of a sieving or classification process, the proportion of the forming surfaces in the total surface may be reduced, but as a rule the proportion is always at least 10%, preferably at least 20%.

The ratio of forming surface to total surface can be determined by evaluation of SEM photographs. The values found for agglomerate diameter and thickness for determining the aspect ratio are used for this. The proportion of the forming surface in the total surface is determined from these values as follows:

Proportion of forming surface [%]=2*front area/total surface*100 where
front area=agglomerate diameter agglomerate diameter
total surface=2*front area+4*side area side area agglomerate thickness*agglomerate diameter For production of the textured agglomerates according to the invention, preferably boron nitride powder of hBN is compacted between two counterrotating rolls to form textured agglomerates.

For this, boron nitride powder or the starting material containing boron nitride powder used for agglomeration is fed continuously in a uniform amount into the space between two counterrotating rolls. Because the rolls rotate in opposite directions, the shearing of the agglomerates is minimized. The gap, i.e. the distance between the rolls, is preferably at most 500 μm. In a preferred embodiment the rolls are pressed together with a specified contact pressure. There is then no specified gap between the two rolls, rather the rolls are in contact. The supported or adhering boron nitride powder is entrained and strongly compacted between the rolls. If no gap is set between the two rolls, during compaction the rolls are forced apart by the textured agglomerates, and the resultant gap corresponds to the thickness of the agglomerates. The material used for making the rolls should have the maximum possible hardness, so that the roll gap geometry remains unchanged. The rolls can be made of a ceramic material, for example silicon nitride.

During metering of the boron nitride powder into the space between the two rolls, it is necessary to ensure that sufficient boron nitride powder goes into the space between the two rolls, so that the particles in the roll gap come in contact and are compacted. With insufficient feed there is little or no compaction and no, or hardly any, agglomerates form. When metering is sufficient, there is a maximum filling volume above the roll gap, depending on the roll geometry, rolling parameters and starting powder. If metering is excessive, the region above the roll gap may "overflow". If the starting material used is too coarse, the roll gap may become clogged, with locking of the rolls.

It is also possible to provide the rolls with surface structuring. For example, surface structuring can be used in order to produce required breaking points in the flake-shaped agglomerates, which determine the size and shape of the agglomerates. The compacted agglomerates can thus easily be comminuted to agglomerates of a specified size and shape. The structuring of the rolls can for example produce a planar-polygonal agglomerate shape.

The boron nitride powder used can be hexagonal boron nitride and mixtures of hexagonal boron nitride with amorphous boron nitride, as well as partially crystalline boron nitride.

The average particle size dso of the hexagonal boron nitride powder used can be 0.5-50 μm, preferably 0.5-15 μm. For example, it is possible to use hexagonal boron nitride powders with an average particle size of 1 μm, 3 μm, 6 μm, 9 μm and 15 μm, but larger average particle sizes up to 50 μmare also possible. Mixtures of various hexagonal boron nitride powders with different particle sizes can also be used. The average particle size ($d_{50}$) of the boron nitride powder used is usually measured by laser diffraction (wet measurement, Mastersizer 2000, Malvern)

It is possible to use $B_2O_3$-free boron nitride powder and boron nitride powder with low $B_2O_3$ contents of up to 0.5 wt. %, but also with higher $B_2O_3$ contents of up to 10 wt. % or more.

It is also possible to use boron nitride granules, for example pelletized granules and sprayed granules of hexagonal boron nitride, or also agglomerates that formed during synthesis of the hexagonal boron nitride. The boron nitride used for the roll compacting can also be surface-coated with additives, the latter preferably being selected from the group comprising polymers, organometallic compounds, silanes, oils, carboxylic acids, copolymers, hydrolysed monomers, partially hydrolysed monomers, partially condensed monomers and nanoparticles.

It is also possible to use mixtures of pulverulent or granulated boron nitride and other powders and therefore produce mixed agglomerates ("hybrid flakes"). Other particles can be used, selected from the group comprising carbides, borides, nitrides, oxides, hydroxides, carbon and metals. These substances can be used both as particles, and as fibres or lamellae of any fineness. Furthermore, polymers can also be processed together with boron nitride into textured agglomerates. For example, $SiO_2$ powder, preferably nanoscale $SiO_2$ powder such as finely divided silica, or also aluminium oxide, boehmite or $Al(OH)_3$, preferably as nanoscale powder, or also aluminium nitride, can be added to the boron nitride powder. If metal particles are added, these can be nitrided in a thermal treatment under nitrogen following compaction. Furthermore, polymers and precursors of ceramic substances, for example salts or alkoxides, can be added. Mixtures of said additives can also be used together with hexagonal boron nitride for the production of mixed granules, and mixed granules from these powder mixtures can also be used for compaction. It is also possible to use the additives in the form of granules and use them in a mixture together with pulverulent or granulated boron nitride as starting material for compaction.

For compacting, it is also possible to use sprayed and pelletized granules of hexagonal boron nitride powders with sol-gel binders such as for example boehmite, MTEOS (methyltriethoxysilane), sodium silicate, silica sol and mixtures with nanoparticles, or also sol-gel-coated boron nitride powder, and sol-gel systems such as for example boehmite, MTEOS (methyltriethoxysilane), sodium silicate, silica sol and mixtures with nanoparticles can be used for coating.

Depending on the nature of the powder materials, in particular their initial particle size and size distribution, passage through the rolls results in flakes of varying size with varying diameter and uniform thickness, and as a rule fractions of uncompacted material are also present.

The compacting operation can be repeated several times. By compacting two or three times, the uncompacted fines fraction can be reduced from up to 50 wt. % to below 5 wt. %. An increase in size of the agglomerates will be observed, both with respect to the diameter and their thickness.

Between two successive compaction steps, the resultant uncompacted fines fraction can be separated by sieving and can be returned to the preceding step.

The fines fraction can, however, also be left with the compacted product rather than being separated. In this case the resultant fines fraction is minimized in a subsequent compression step, as it too is compacted to agglomerates.

When using a fine starting material with an average particle size ($d_{50}$) of approx. 1 μm, for example agglomerates with a grain size range of 1-4 mm can be obtained in a first compaction. In a second compaction the agglomerate diameter can increase to approx. 1 cm. In a final compaction, textured agglomerates up to 2 cm in size can be obtained.

When using a coarser starting material of primary particles with an average particle size ($d_{50}$) of 15 μm, for example in the first pass textured agglomerates with a size of 1-2 cm can be obtained, in the second pass textured agglomerates of 3-4 cm, and in the last compaction step 5-7 cm is possible.

If the starting material used is not powder, but pelletized granules, sprayed granules or the like, then from granules with an average granule size of for example 100-200 μm, textured agglomerates with a size of several centimetres are produced in the first pass, and "infinite" agglomerates are obtained in the second pass.

Compaction is optionally preceded, depending on the starting material to be used, advantageously by a protective sieving or classification, to prevent damage or blocking of the rolls.

The material compacted to textured agglomerates can undergo a thermal treatment step, sintering. This thermal treatment of the agglomerates can further improve the mechanical stability and therefore also the processability, for example the metering properties.

The thermal conductivity achievable in boron nitride polymer composites can also be further increased by sintering of the flake-shaped agglomerates.

The thermal treatment may result in changes in the properties of the agglomerates and primary particles. The degree of crystallization of the primary particles may increase, which is associated with growth of the primary particles. The lattice oxygen content and the specific surface decrease with increasing temperature of thermal treatment and duration of thermal treatment. Density, hardness and mechanical stability can be maximized depending on the temperature of thermal treatment and the duration of thermal treatment.

Depending on the sintering conditions and the nature of the textured agglomerates, loose, individual agglomerates with a ceramic clinking sound are obtained, or a sinter cake composed of textured agglomerates, which can be broken up for example by shaking or screening and separated into loose agglomerates.

The thermal treatment can be carried out at a temperature of up to 2300° C., preferably in the temperature range 1200-2050° C., more preferably 1400-2000° C. and especially preferably 1600-1950° C. in a protective gas atmosphere. In the case of mixed agglomerates (hybrid flakes) the thermal treatment can be carried out for example at temperatures up to 2000° C. in a protective gas atmosphere or in air or also with a reactive gas, for example ammonia or carbon monoxide or gas mixtures. After the maximum temperature is reached, a holding time of up to several hours or days can be applied. Nitrogen or argon can be used as the protective gas. The thermal treatment can be carried out in a continuous process or in a batch process.

After compaction or optionally after subsequent thermal treatment, the agglomerates or the sinter cake obtained can be processed to the desired target agglomerate size.

The target size for the agglomerate size depends mainly on the particular use. For use as filler for polymers, it depends for example on the proposed processing technology and the desired degree of filling, and the properties of the particular plastic and processing variables such as the viscosity must be taken into account, and it can be adapted to the respective application conditions, for example use as filler for thermoplastics, as filler for thermosets, processing by injection moulding, extrusion or cast resin and film extrusion.

The target agglomerate size can be achieved by the usual steps such as sieving, sieve-breaking and classifying. Any fines fraction present can be removed first. The agglomerates with a size of several millimetres to several centimetres are processed in a further process step to defined agglomerate sizes. For this it is possible for example to use commercially available sieves of different sieve mesh and sieving aids on a vibrating sieve. A multistage sieving/sieving-comminution process has proved advantageous.

To achieve the target agglomerate size, after compaction and/or after the thermal treatment and optional removal of the fines fraction, the agglomerates are first preferably passed through a sieve with a mesh size of 3-4 mm. Simple sieving aids, such as rubber balls or plastic rings, are sufficient to break the agglomerates, which typically have a thickness of approx. 30 to 350 μm, by a jolting motion. Below a sieve mesh of 1 mm, for further sieving comminution it is possible to use steel balls, preferably rubber-coated steel balls, to obtain agglomerate fractions of for example <700 μm, <500 μm or <350 μm.

In the fractionation steps, finer agglomerate fractions are produced to a varying extent. For example fractions <200 μm, <150 μm and <100 μm can be isolated in decreasing amount. In order to obtain finer agglomerate sizes below 350 μm with a narrow agglomerate size distribution, these can in their turn be produced from the fraction <350 μm obtained as described above, by sieving or also by classifying. In this way, for example fractions of 100-200 μm, 80-150 μm and 150-200 μm can be obtained. Agglomerate fractions below 100 μm are preferably produced by classifying, for better adherence to the upper and lower limits of the agglomerate sizes.

As in alternative to sieving, the specified comminution of textured agglomerates can also take place by sieving-trituration, in classifier mills, structured roll crushers and cutting wheels. Dry grinding for example in a ball mill is also possible.

For using the textured agglomerates for particular applications, it is advantageous to submit the agglomerate size fractions obtained to a further, specific treatment. Examples of such treatments are wet-chemical preparation, for surface removal of adhering $B_2O_3$, surface modification by means of additives, coating by means of fluidized-bed processes and thermal/oxidative activation. Surface modification with additives can for example take place by adsorption from a suspension. Examples of coatings that can be used are polymers, organometallic compounds, silanes, oils, carboxylic acids, copolymers, hydrolysed, partially hydrolysed and partially condensed monomers, nanoparticles such as for example $SiO_2$ nanoparticles and surface-functionalized nanoparticles, for example surface-functionalized $SiO_2$ nanoparticles. The additives used for the surface modification can serve as wetting agents or as adhesion promoters.

In another embodiment of the invention, by comminution of large flake-shaped agglomerates with a thickness of for example 100 or 200 μm, using a multi-blade device, with blade spacing far smaller than the thickness of the agglomerates, for example 50 μm, or by means of a vibrated blade, needles and flake-shaped agglomerates can be produced, which are then, as described previously, comminuted by a multistage sieving process and separated into agglomerate fractions. Textured agglomerates produced in this way display a reversed preferred orientation of the boron nitride primary particles, with their basal planes perpendicular to the main surface of the flake-shaped agglomerate. Determination of the texture index on textured agglomerates produced in this way gives values of 0.7 or less, preferably of 0.5 or less, more preferably of 0.35 or less, especially preferably of 0.3 or less. As a result of this orientation, in filled polymers higher through-plane than in-plane thermal conductivity values can be achieved, because the flake-shaped agglomerates produced in this way can line up in the filled polymer, in particular when the aspect ratio of the agglomerates is >2.0. Orientation can take place for example during casting of thin plates or in injection moulding.

After compaction or after optional subsequent thermal treatment, the textured agglomerates according to the invention can undergo mechanical processing. The mechanical processing can take place for example on the roller horse in the plastic container without balls (with a degree of filling of 30 vol. % for one to two hours) or also in the tumble mixer. As a result of this treatment, corners and edges of the textured agglomerates are rounded and higher solids contents and thermal conductivity values can be achieved in polymer-boron nitride composites.

Apart from the method described for compaction between two rolls, other methods can also be used for producing the textured agglomerates according to the invention.

One alternative consists of applying a layer of powder on a carrier film, for example by spraying with a boron nitride suspension. With controlled evaporation of the suspending medium, a texture is already formed before compaction. By subsequent combined compaction of the carrier film and the layer of powder, the texture can be further enhanced. The carrier film can then be removed, or it can be decomposed in a subsequent thermal treatment step. The resultant compacted layer of powder can be processed by breaking and sieving to textured agglomerates, as described above.

Another possibility comprises doctor-blade film casting, the film obtained is then compressed or rolled, depending on the organic binders used, compacted by means of heated rolls and comminuted by cutting to textured agglomerates. Optionally, thermal treatment of the agglomerates can take place before or after cutting.

The agglomerates according to the invention can be used as filler for polymers and can be processed to polymer-boron nitride composites. For production of the filled polymers it is also possible to use mixtures of the agglomerates according to the invention with other known fillers for polymers, for example aluminium oxide. For production of the filled polymers it is also possible to use mixtures of different fractions of the agglomerates according to the invention, as well as mixtures of said fractions with primary particle fractions.

The agglomerates according to the invention, both pure boron nitride agglomerates and mixed granules ("hybrid flakes"), are suitable as starting material for the production of boron nitride sinter materials and boron nitride mixed ceramics. Preferably the boron nitride sinter materials and boron nitride mixed ceramics are produced by hot pressing or hot isostatic pressing. The agglomerates used for this are preferably uncalcined agglomerates and agglomerates heat-treated at low temperatures up to about 1600° C., for example agglomerates that have been treated to remove binders or calcined. The high density and high bulk density of the agglomerates according to the invention ensure much higher degrees of mould filling and green densities and therefore more efficient compaction, than was possible with conventional cold-isostatic compressed granules, pelletized or sprayed granules. When the agglomerates according to the invention are used as starting material for hot pressing, hot-pressed boron nitride sintered compacts with very pronounced texture and very pronounced anisotropic properties can be obtained. Furthermore, textured agglomerates can be mixed with non-agglomerated boron nitride powders, to serve as reinforcing elements or nuclei for the crystallization of hexagonal boron nitride during hot pressing. Mixing of heat-treated textured agglomerates with turbostratic boron nitride is particularly advantageous. By using textured agglomerates, the properties of boron nitride sintered compacts can be improved, for example an increase in mechanical strength. It is also possible to produce boron nitride mixed ceramics, for example based on boron nitride and silicon nitride, based on boron nitride and zirconium dioxide and based on boron nitride, zirconium dioxide and silicon carbide, with textured agglomerates according to the invention. Hot pressing takes place in graphite dies at temperatures from about 1600 to 2000° C. and at a pressure up to about 25 MPa. The texture index measured on the sintered compact, for hot-pressed boron nitride sintered compacts produced with agglomerates according to the invention, can have values up to 120 or more. The texture index is measured on samples that are prepared perpendicularly to the direction of hot pressing. Preferably the texture index measured on the sintered compact has values of at least 2, more preferably values of at least 3, more preferably values of at least 5, more preferably values of at least 10 and especially preferably values of 20 or more.

The agglomerates according to the invention can also be used for other applications, for example as raw material for the synthesis of cubic boron nitride, and as loose fill for heating cartridges.

EXAMPLES

The following examples serve for further explanation of the invention.

Example 1

Hexagonal boron nitride powder with a primary particle size $d_{50}$ of 3 μm (measured using Mastersizer 2000, Malvern, wet measurement; from ESK Ceramics GmbH & Co. KG, BORONID S1) is fed continuously by means of a vibratory chute between two silicon nitride rolls arranged without a gap. The roll width is 150 mm, roll diameter 13 cm. The rolls are rotated at 15 rev/min and are squeezed together with a force of 1.7 t. In this way the boron nitride powder is roll-compacted with a throughput of 4 kg/h.

The resultant material is granulated material in the form of flakes with a thickness of about 50 μm and a fines fraction of uncompacted starting material. The material obtained is then heat-treated at 1200° C. for 2 hours in a nitrogen atmosphere. The heat-treated flake-shaped agglomerates are broken by means of a sieve and sieving aid first to a size of less than 3 mm, then to less than 700 μm. Finally the resultant flake-shaped agglomerates are broken by sieving to a size smaller than 350 μm and then fractionated by further sieving to >210 μm and >100 μm, in order to separate the fines fraction <100 µm of 55 wt. % (relative to the total amount of the heat-treated agglomerates).

Example 2

Hexagonal boron nitride powder with a primary particle size $d_{50}$ of 3 µm is fed continuously by means of a vibratory chute and is roll-compacted with a throughput of 4 kg/has in example 1.

The resultant material is granulated material in the form of flakes with a thickness of about 50 µm and a fines fraction of uncompacted starting material and it is then dedusted by sieving to <100 µm, with 46 wt. % of the material obtained in roll compaction being separated as fines fraction. The separated coarse fraction is then heat-treated at 1200° C. for 2 hours in a nitrogen atmosphere. The heat-treated flake-shaped agglomerates are broken by means of a sieve and sieving aid first to a size of less than 3 mm, then to less than 700 µm. Finally the resultant flake-shaped agglomerates are broken by sieving to a size smaller than 350 µm and then fractionated by further sieving to >210 µm and >100 µm, in order to separate the fines fraction <100 µm of 5 wt. %.

Example 3

Hexagonal boron nitride powder with a primary particle size dso of 3 µm is fed continuously by means of a vibratory chute and is roll-compacted with a throughput of 4 kg/h as in example 1.

The resultant material is granulated material in the form of flakes with a thickness of about 50 µm and a fines fraction of uncompacted starting material and it is then dedusted by sieving to <100 µm, with 46 wt. % of the material obtained in roll compaction being separated as fines fraction. The separated coarse fraction is then heat-treated at 1600° C. for 2 hours in a nitrogen atmosphere. The heat-treated flake-shaped agglomerates are broken by means of a sieve and sieving aid first to a size of less than 3 mm, then to less than 700 µm. Finally the resultant flake-shaped agglomerates are broken by sieving to a size smaller than 350 µm and then fractionated by further sieving to >210 µm and >100 µm, in order to separate the fines fraction <100 µm of 4 wt. %.

Example 4

Hexagonal boron nitride powder with a primary particle size $d_{50}$ of 3 µm is fed continuously by means of a vibratory chute and is roll-compacted with a throughput of 4 kg/has in example 1.

The resultant material is granulated material in the form of flakes with a thickness of about 50 µm and a fines fraction of uncompacted starting material and it is then dedusted by sieving to <100 µm, with 46 wt. % of the material obtained in roll compaction being separated as fines fraction. The separated coarse fraction is then heat-treated at 1950° C. for 2 hours in a nitrogen atmosphere. The heat-treated flake-shaped agglomerates are broken by means of a sieve and sieving aid first to a size of less than 3 mm, then to less than 700 µm. Finally the resultant flake-shaped agglomerates are broken by sieving to a size smaller than 350 µm and then fractionated by further sieving to >210 µm and >100 µm, in order to separate the fines fraction <100 µm of 3 wt. %.

Example 5

Hexagonal boron nitride powder with a primary particle size $d_{50}$ of 3 µm is fed continuously by means of a vibratory chute and is roll-compacted with a throughput of 4 kg/has in example 1.

The resultant material is then compacted for a second time with a throughput of 5.8 kg/h. The resultant material is granulated material in the form of flakes with a thickness of about 50 to 100 µm and a fines fraction of uncompacted starting material and it is then dedusted by sieving to <100 µm, with 26 wt. % of the material obtained in roll compaction being separated as fines fraction.

The separated coarse fraction is then heat-treated at 1950° C. for 2 hours in a nitrogen atmosphere. The heat-treated flake-shaped agglomerates are broken by means of a sieve and sieving aid first to a size of less than 3 mm, then to less than 700 µm. Finally the resultant flake-shaped agglomerates are broken by sieving to a size smaller than 350 µm and then fractionated by further sieving to >210 µm and >100 µm, in order to separate the fines fraction <100 µm of 3 wt. %.

Example 6

Hexagonal boron nitride powder with a primary particle size $d_{50}$ of 3 µm is fed continuously by means of a vibratory chute and is roll-compacted with a throughput of 4 kg/has in example 1.

The resultant material is then compacted for a second time with a throughput of 5.8 kg/hand for a third time with a throughput of 7 kg/h. After each pass through the rolls, the granulated material obtained is dedusted by sieving to <100 µm, finally with 5 wt. % of the material obtained in roll compaction being separated as fines fraction. The thickness of the agglomerates obtained in the form of flakes is about 50 to 200 µm.

The separated coarse fraction is then heat-treated at 1950° C. for 2 hours in a nitrogen atmosphere. The heat-treated flake-shaped agglomerates are broken by means of a sieve and sieving aid first to a size of less than 3 mm, then to less than 700 µm. Finally the resultant flake-shaped agglomerates are broken by sieving to a size smaller than 350 µm and then fractionated by further sieving to >210 µm and >100 µm, in order to separate the fines fraction <100 µm of 4 wt. %.

Example 7 I)

Hexagonal boron nitride powder with a primary particle size $d_{50}$ of 3 µm is fed continuously by means of a vibratory chute and is roll-compacted with a throughput of 4 kg/h as in example 1.

The resultant material is then compacted for a second time with a throughput of 5 kg/hand for a third time with a throughput of 6.5 kg/h. Between each compacting operation the fines fraction (<100 µm) was determined, but not separated. The resultant material is granulated material in the form of flakes with a thickness of about 50 to 200 µm and it is then dedusted by sieving to <100 µm, with 15 wt. % of the material obtained in roll compaction being separated as fines fraction.

The separated coarse fraction is then heat-treated at 1200° C. for 2 hours in a nitrogen atmosphere. The heat-treated flake-shaped agglomerates are broken by means of a sieve and sieving aid first to a size of less than 3 mm, then to less than 700 µm. Finally the resultant flake-shaped agglomerates are broken by sieving to a size smaller than 350 µm and then fractionated by further sieving.

Example 7 I) A)

A <100 µm fraction is prepared from example 7 I) by sieving.

Example 7 I) B)

A 100-210 µm fraction is prepared from example 7 I) by sieving.

Example 7 I) C)

A 210-350 µm fraction is prepared from example 7 I) by sieving.

For examples 7 I) A, B) and C), the values determined on these agglomerate fractions for the texture index and the specific surface according to the BET method (nitrogen adsorption, Beckmann-Coulter) are presented in Table 1, and Table 1 also shows, for examples 7 I) A) and B), the aspect ratio determined from SEM photographs.

Example 7 II)

Example 7 I) was repeated, but the coarse fraction separated after roll compaction three times was heat-treated at 1600° C. for 2 hours in a nitrogen atmosphere.

Example 7 II) A)

A <100 µm fraction is prepared from example 7 II) by sieving.

Example 7 II) B)

A 100-210 µm fraction is prepared from example 7 II) by sieving.

Example 7 II) C)

A 210-350 µm fraction is prepared from example 7 II) by sieving.

For examples 7 II) B) and C), the values determined on these agglomerate fractions for the texture index, the specific surface according to the BET method (nitrogen adsorption, Beckmann-Coulter) and the aspect ratio determined from SEM photographs are presented in Table 1.

Example 7 III)

Example 7 I) was repeated, but the coarse fraction separated after roll compaction three times was heat-treated at 1950° C. for 2 hours in a nitrogen atmosphere.

Example 7 III) A)

A <100 µm fraction is prepared from example 7 III) by sieving.
The average agglomerate size ($d_{50}$) is 78 µm.

Example 7 III) B)

A 100-210 µm fraction is prepared from example 7 III) by sieving.
The average agglomerate size ($d_{50}$) is 156 µm.

Example 7 III) C)

A 210-350 µm fraction is prepared from example 7 III) by sieving.
The average agglomerate size ($d_{50}$) is 347 µm.
For examples 7 III) B) and C), the values determined on these agglomerate fractions for the texture index, the specific surface according to the BET method (nitrogen adsorption, Beckmann-Coulter) and the aspect ratio determined from SEM photographs are presented in Table 1.

Example 8

Hexagonal boron nitride powder with a primary particle size $d_{50}$ of 15 µm (measured using Mastersizer 2000, Malvern, wet measurement; from ESK Ceramics GmbH & Co. KG, BORONID S15) is fed continuously by means of a vibratory chute and is roll-compacted with a throughput of 5.2 kg/has in example 1.

The granulated material obtained in the form of flakes with a thickness of about 50 µm contains 28 wt. % 100 µm. Then, without first separating the fines fraction, it is heat-treated at 1200° C. for 2 hours in a nitrogen atmosphere. The heat-treated flake-shaped agglomerates are broken by means of a sieve and sieving aid first to a size of less than 3 mm, then to less than 700 µm. Finally the resultant flake-shaped agglomerates are broken by sieving to a size smaller than 350 µm and then fractionated by further sieving to >210 µm and >100 µm, in order to separate the fines fraction <100 µm of 30 wt. %.

Example 9

Hexagonal boron nitride powder with a primary particle size $d_{50}$ of 15 µm is fed continuously by means of a vibratory chute and is roll-compacted with a throughput of 5.2 kg/h as in example 1.

The granulated material obtained in the form of flakes with a thickness of about 50 µm is then dedusted by sieving to <100 µm, with 28 wt. % of the material obtained in roll compaction being separated as fines fraction.

The separated coarse fraction is then heat-treated at 1200° C. for 2 hours in a nitrogen atmosphere. The heat-treated flake-shaped agglomerates are broken by means of a sieve and sieving aid first to a size of less than 3 mm, then to less than 700 µm. Finally the resultant flake-shaped agglomerates are broken by sieving to a size smaller than 350 µm and then fractionated by further sieving to >210 µm and >100 µm, in order to separate the fines fraction <100 µm of 5 wt. %.

Example 10

Hexagonal boron nitride powder with a primary particle size $d_{50}$ of 15 µm is fed continuously by means of a vibratory chute and is roll-compacted with a throughput of 5.2 kg/has in example 1.

The granulated material obtained in the form of flakes with a thickness of about 50 µm is then dedusted by sieving to <100 µm, with 26 wt. % of the material obtained in roll compaction being separated as fines fraction.

The separated coarse fraction is then heat-treated at 1600° C. for 2 hours in a nitrogen atmosphere. The heat-treated flake-shaped agglomerates are broken by means of a sieve and sieving aid first to a size of less than 3 mm, then to less than 700 µm. Finally the resultant flake-shaped agglomerates are broken by sieving to a size smaller than 350 µm and then fractionated by further sieving to >210 µm and >100 µm, in order to separate the fines fraction <100 µm of 4 wt. %.

Example 11

Hexagonal boron nitride powder with a primary particle size $d_{50}$ of 15 µm is fed continuously by means of a vibratory chute and is roll-compacted with a throughput of 5.2 kg/has in example 1.

The granulated material obtained in the form of flakes with a thickness of about 50 μm is then dedusted by sieving to <100 μm, with 26 wt. % of the material obtained in roll compaction being separated as fines fraction.

The separated coarse fraction is then heat-treated at 1950° C. for 2 hours in a nitrogen atmosphere. The heat-treated flake-shaped agglomerates are broken by means of a sieve and sieving aid first to a size of less than 3 mm, then to less than 700 μm. Finally the resultant flake-shaped agglomerates are broken by sieving to a size smaller than 350 μm and then fractionated by further sieving to >210 μm and >100 μm, in order to separate the fines fraction <100 μm of 2 wt. %.

Example 12

Hexagonal boron nitride powder with a primary particle size $d_{50}$ of 15 μm is fed continuously by means of a vibratory chute and is roll-compacted with a throughput of 5.2 kg/h as in example 1.

The resultant material is then compacted for a second time with a throughput of 8 kg/h. The granulated material obtained in the form of flakes with a thickness of about 50 to 100 μm is dedusted by sieving to <100 μm, with 16 wt. % of the material obtained in roll compaction being separated as fines fraction.

The separated coarse fraction is heat-treated at 1950° C. for 2 hours in a nitrogen atmosphere. The heat-treated flake-shaped agglomerates are broken by means of a sieve and sieving aid first to a size of less than 3 mm, then to less than 700 μm. Finally the resultant flake-shaped agglomerates are broken by sieving to a size smaller than 350 μm and then fractionated by further sieving to >210 μm and >100 μm, in order to separate the fines fraction <100 μm of 3 wt. %.

Example 13

Hexagonal boron nitride powder with a primary particle size $d_{50}$ of 15 μm is fed continuously by means of a vibratory chute and is roll-compacted with a throughput of 5.2 kg/h as in example 1.

The resultant material is then compacted for a second time with a throughput of 8 kg/h and for a third time with a throughput of 16 kg/h. The granulated material obtained in the form of flakes with a thickness of about 50 to 200 μm is dedusted by sieving to <100 μm, with 5 wt. % of the material obtained in roll compaction being separated as fines fraction.

The separated coarse fraction is heat-treated at 1950° C. for 2 hours in a nitrogen atmosphere. The heat-treated flake-shaped agglomerates are broken by means of a sieve and sieving aid first to a size of less than 3 mm, then to less than 700 μm. Finally the resultant flake-shaped agglomerates are broken by sieving to a size smaller than 350 μm and then fractionated by further sieving to >210 μm and >100 μm, in order to separate the fines fraction <100 μm of 4 wt. %.

Example 14 I)

Hexagonal boron nitride powder with a primary particle size $d_{50}$ of 15 μm is fed continuously by means of a vibratory chute and is roll-compacted with a throughput of 5 kg/h as in example 1.

The resultant material is then compacted for a second time with a throughput of 7.9 kg/h and for a third time with a throughput of 15.9 kg/h. Between each compacting operation the fines fraction (<100 μm) was determined, but not separated. The granulated material obtained in the form of flakes with a thickness of about 50 to 200 μm is then dedusted by sieving to <100 μm, with 12 wt. % of the material obtained in roll compaction being separated as fines fraction.

The separated coarse fraction is then heat-treated at 1200° C. for 2 hours in a nitrogen atmosphere. The heat-treated flake-shaped agglomerates are broken by means of a sieve and sieving aid first to a size of less than 3 mm, then to less than 700 μm. Finally the resultant flake-shaped agglomerates are broken by sieving to a size smaller than 350 μm and then fractionated by further sieving.

Example 14 I) A)

A <100 μm fraction is prepared from example 14 I) by sieving.

Example 14 I) B)

A 100-210 μm fraction is prepared from example 14 I) by sieving.

Example 14 I) C)

A 210-350 μm fraction is prepared from example 14 I) by sieving.

For examples 14 I) A, B) and C), the values determined on these agglomerate fractions for the texture index and the specific surface according to the BET method (nitrogen adsorption, Beckmann-Coulter) are presented in Table 1, and Table 1 also shows, for example 14 I) C), the aspect ratio determined from SEM photographs.

Example 14 II)

Example 14 I) was repeated, but the coarse fraction separated after roll compaction three times was heat-treated at 1600° C. for 2 hours in a nitrogen atmosphere.

Example 14 II) A)

A <100 μm fraction is prepared from example 14 II) by sieving.

Example 14 II) B)

A 100-210 μm fraction is prepared from example 14 II) by sieving.

Example 14 II) C)

A 210-350 μm fraction is prepared from example 14 II) by sieving.

For examples 14 II) A, B) and C), the values determined on these agglomerate fractions for the texture index and the specific surface according to the BET method (nitrogen adsorption, Beckmann-Coulter) are presented in Table 1, and Table 1 also shows, for example 14 II) C), the aspect ratio determined from SEM photographs.

Example 14 III)

Example 14 I) was repeated, but the coarse fraction separated after roll compaction three times was heat-treated at 1950° C. for 2 hours in a nitrogen atmosphere.

Example 14 III) A)

A <100 µm fraction is prepared from example 14 III) by sieving.

Example 14 III) B)

A 100-210 µm fraction is prepared from example 14 III) by sieving.

Example 14 III) C)

A 210-350 µm fraction is prepared from example 14 III) by sieving.

For example 14 III) C), the value determined on this agglomerate fraction for the texture index, the specific surface according to the BET method (nitrogen adsorption, Beckman-Coulter) and the aspect ratio determined from SEM photographs are presented in Table 1.

Example 15

Hexagonal boron nitride powder with a primary particle size $d_{50}$ of 3 µm is fed continuously by means of a vibratory chute and is roll-compacted with a throughput of 4 kg/has in example 1.

The resultant material is granulated material in the form of flakes with a thickness of about 50 µm and a fines fraction of uncompacted starting material and it is then dedusted by sieving to <100 µm, with 46 wt. % of the material obtained in roll compaction being separated as fines fraction.

The separated coarse fraction is then heat-treated at 1900° C. for 12 hours in a nitrogen atmosphere. The heat-treated flake-shaped agglomerates are broken by means of a sieve and sieving aid first to a size of less than 3 mm, then to less than 700 µm. Finally the resultant flake-shaped agglomerates are broken by sieving to a size smaller than 350 µm and then fractionated by further sieving to >210 µm and >100 µm, in order to separate the fines fraction <100 µm of 5 wt. %.

The specific surface was measured according to the BET method (nitrogen adsorption, Beckmann-Coulter) on the 210-350 µm fraction. The textured agglomerates have a very low value of 0.99 m²/g. The texture index measured on this fraction is 3.1.

Example 16

Hexagonal boron nitride powder with a primary particle size $d_{50}$ of 3 µm is fed continuously by means of a vibratory chute and is roll-compacted with a throughput of 4 kg/h as in example 1.

The resultant material is then compacted for a second time with a throughput of 5 kg/hand for a third time with a throughput of 6.5 kg/h. The resultant material is granulated material in the form of flakes with a thickness of about 50 to 200 µm and it is then dedusted by sieving to <100 µm, with 15 wt. % of the material obtained in roll compaction being separated as fines fraction.

The separated coarse fraction is then broken by means of a sieve and sieving aid first to a size of less than 3 mm, then to less than 700 µm. Finally the resultant flake-shaped agglomerates are broken by sieving to a size smaller than 350 µm and then fractionated by further sieving to a size of 210-350 µm. The texture index determined on this agglomerate fraction is shown in Table 1.

Example 17

Hexagonal boron nitride powder with a primary particle size $d_{50}$ of 15 µm is fed continuously by means of a vibratory chute and is roll-compacted with a throughput of 5 kg/has in example 1.

The resultant material is then compacted for a second time with a throughput of 7.9 kg/h and for a third time with a throughput of 15.9 kg/h. The resultant material is granulated material in the form of flakes with a thickness of about 50 to 200 µm and it is then deducted by sieving to <100 µm, with 15 wt. % of the material obtained in roll compaction being separated as fines fraction.

The separated coarse fraction is then broken by means of a sieve and sieving aid first to a size of less than 3 mm, then to less than 700 µm. Finally the resultant flake-shaped agglomerates are broken by sieving to a size smaller than 350 µm and then fractionated by further sieving to a size of 210-350 µm. The texture index determined on this agglomerate fraction is shown in Table 1.

Example 18

BN—$Al_2O_3$, sprayed granules with an average granule size (dso) of 100 µm and an Al content of 6 wt. % are fed continuously by means of a vibratory chute and are roll-compacted with a throughput of 7 kg/h as in example 1.

The resultant material is then compacted for a second time with a throughput of 12.9 kg/h and for a third time with a throughput of 19.9 kg/h. The granulated material obtained in the form of flakes with a thickness of about 50 to 200 µm is then dedusted by sieving to <100 µm, with 22 wt. % of the material obtained in roll compaction being separated as fines fraction. These flakes have a diameter of several centimetres. They are then heat-treated in air at 1000° C. for one hour and can be used as filler for polymers.

Example 19

Hexagonal boron nitride powder with a primary particle size dso of 3 µm is fed continuously by means of a vibratory chute and is roll-compacted with a throughput of 4 kg/h in a first pass as in example 1. In a second pass (throughput 5 kg/h) and a third pass (throughput 6.5 kg/h), agglomerates were produced in the form of flakes with a thickness of about 50 to 200 µm and a diameter of several centimetres.

Small round disks (3.5 cm²) were cut out of the flakes obtained and a texture index of 11.4 was determined on these.

The density found both geometrically and by measurement of buoyancy is shown in Table 2.

Example 20

Hexagonal boron nitride powder with a primary particle size $d_{50}$ of 3µ,m is fed continuously by means of a vibratory chute and is roll-compacted with a throughput of 4 kg/h in a first pass as in example 1. In a second pass (throughput 5 kg/h) and a third pass (throughput 6.5 kg/h), agglomerates were produced in the form of flakes with a thickness of about 50 to 200µ,m and a diameter of several centimetres.

The agglomerates were heat-treated at 1950° C. for 2 hours under nitrogen.

Small round disks (3.5 cm²) were cut out of the flakes obtained and a texture index of 7.5 was determined on these.

The density found both geometrically and by measurement of buoyancy is shown in Table 2.

Example 21

Hexagonal boron nitride powder with a primary particle size $d_{50}$ of 15 µm is fed continuously by means of a vibratory chute and is roll-compacted with a throughput of 5 kg/h in a first pass as in example 1. In a second pass (throughput 7.9 kg/h) and a third pass (throughput 15.9 kg/h) agglomerates were produced in the form of flakes with a thickness of about 50 to 200 µm and a diameter of several centimetres.

Small round disks (3.5 cm²) were cut out of the flakes obtained and a texture index of 14.4 was determined on these.

The density found both geometrically and by measurement of buoyancy is shown in Table 2.

Example 22

Hexagonal boron nitride powder with a primary particle size $d_{50}$ of 15 µm is fed continuously by means of a vibratory chute and is roll-compacted with a throughput of 5 kg/h in a first pass as in example 1. In a second pass (throughput 7.9 kg/h) and a third pass (throughput 15.9 kg/h) agglomerates were produced in the form of flakes with a thickness of about 50 to 200 µm and a diameter of several centimetres.

The agglomerates were heat-treated at 1950° C. for 2 hours under nitrogen.

Small round disks (3.5 cm²) were cut out of the flakes obtained and a texture index of 66.9 was determined on these.

The density found both geometrically and by measurement of buoyancy is shown in Table 2.

Example 23

Example 22 was repeated, but the agglomerates were not heat-treated at 1950° C., but at 2050° C. for 2 hours under nitrogen.

Small round disks (3.5 cm²) were cut out of the flakes obtained and a texture index of 108 was determined on these.

The density found both geometrically and by measurement of buoyancy is shown in Table 2.

In the following examples 24 to 32 and the comparative examples, boron nitride agglomerates were processed into filled epoxides (epoxide-boron nitride composites). Using these filled epoxide samples, comparative values can be obtained for the thermal conductivity of different boron nitride agglomerates. With other polymers, even higher thermal conductivity values can be reached, for example in the injection moulding of thermoplastics.

Example 24 I) A)

Textured Agglomerates as Filler in Epoxide, Degree of Filling 43%, Random Arrangement:

53 g of textured agglomerates in flake form from example 7) I) A) are dispersed in 70 g of a mixture of epoxide and hardener (EpoFix, Struers, Willich, Germany) with a blade stirrer. At 0.2 bar, air is expelled in a vacuum stirrer. The mixture is poured into dishes, in which it solidifies.

To measure the thermal conductivity, a 10×10×2 mm³ plate is prepared from the middle of the moulding. The thermal conductivity TC is determined by measuring the quantities thermal diffusivity a, specific heat capacity $c_p$ and density D and is calculated from these quantities according to the equation $TC=a*c_p*D$. Measurement of a and $c_p$ is performed with the Nanoflash LFA 447 (Netzsch, Selb, Germany) on samples with a size of 10×10×2 mm³ near room temperature. The density is determined by weighing and determination of the geometric dimensions of the precisely shaped samples. The measured value obtained for the thermal conductivity is shown in Table 3.

Examples 24 I) B) and C), 24 II) A), B) and C), 24 III) A), B) and C), and Example 25

Textured Agglomerates as Filler in Epoxide, Degree of Filling 43%, Random Arrangement:

Example 24 I) A) was repeated, but using 53 g of textured agglomerates in flake form according to the respective example stated in Table 3 ("Filler" column).

Example 26

Textured Agglomerates as Filler in Epoxide, Degree of Filling 43%, Arrangement with Preferred Orientation, Through Plane 53 g of textured agglomerates in flake form from example 7) III) C) are dispersed in 70 g of a mixture of epoxide and hardener (EpoFix, Struers, Willich, Germany) with a blade stirrer. At 0.2 bar, air is expelled in a vacuum stirrer. The mixture is cast between two acrylic glass disks, which are fixed with a distance of 2 mm between them. The mixture solidifies between the acrylic glass disks. A sample with a size of 10×10×2 mm³ is prepared from the solidified plate, the thickness of the solidified plate being equal to the height of the sample.

The thermal conductivity is measured as described in example 24 I) A) (Table 3). Owing to the arrangement of the textured agglomerates with preferred orientation, the thermal conductivity value determined is mainly "through plane" relative to the basal planes of the boron nitride primary particle lamellae.

Example 27

Textured Agglomerates as Filler in Epoxide, Degree of Filling 43%, Arrangement with Preferred Orientation, in Plane From the solidified plate from example 26, 5 lamellae with a size of 10×10×2 mm³ are prepared. The lamellae are glued together, forming a cube with 10 mm edge length. Now the cube is turned so that 5 end faces of the lamellae in the stack are facing upwards. The stack aligned in this way is ground down from above and below to 2 mm thickness. A lamella with a size of 10×10×2 mm³ is formed again, which consists of 5 segments glued together.

The thermal conductivity is measured as described in example 24 I) A) (Table 3). Owing to the arrangement of the textured agglomerates with preferred orientation, the thermal conductivity value determined is mainly "in plane" relative to the basal planes of the boron nitride primary particle lamellae.

The in-plane value determined is higher than the through-plane value from example 26.

Example 28

Textured Agglomerates as Filler in Epoxide, Degree of Filling 43%, Arrangement with Preferred Orientation, Through Plane A mixture is prepared from 3% Boronid SCP1 (boron nitride powder with average particle size of 1 µm, ESK Ceramics GmbH & Co. KG), 24% Boronid S15 (boron nitride powder with average particle size of 15 µm, ESK Ceramics) and 73% flakes from example 7 I I I) C). 53 g of the mixture is processed according to example 26, cast between two acrylic glass disks, producing a solidified plate. A thermal conductivity sample is prepared from the solidified plate as in example 26 and the thermal conductivity is measured (Table 3).

Example 29

Textured Agglomerates as Filler in Epoxide, Degree of Filling 43%, Arrangement with Preferred Orientation, in Plane Example 28 is repeated, but 5 lamellae with a size of 10×10×2 mm$^3$ are prepared from the solidified plate. These are processed as in example 27 into an in-plane thermal conductivity sample and the thermal conductivity in plane is measured (Table 3).

The in-plane value determined is higher than the through-plane value from example 28.

Example 30

53 g of flakes from example 7 III) C) are treated mechanically in a tumble mixer for 2 hours. The flakes are processed according to example 24 I) A), a thermal conductivity sample is prepared and the thermal conductivity is measured (Table 3).

Example 31

Textured Agglomerates (not Heat-Treated) as Filler in Epoxide, Degree of Filling 59%

105 g of the 210-350 µm agglomerate fraction from example 17 is dispersed in 70 g of a mixture of epoxide and hardener (EpoFix, Struers, Willich, Germany) with a blade stirrer. At 0.2 bar, air is expelled in a vacuum stirrer. The mixture is poured into dishes, where it solidifies.

For measurement of the thermal conductivity, a lamella with a size of 10×10×2 mm$^3$ is prepared from the middle of the moulding. The thermal conductivity is measured as described in example 24 I) A), and the thermal conductivity value determined is shown in Table 3.

Example 32

Textured Agglomerates (Heat-Treated) as Filler in Epoxide, Degree of Filling 59%

Example 31 was repeated, but 105 g of the agglomerates from example 14 III) C) was processed instead of the agglomerates from example 32.

The thermal conductivity value determined (see Table 3) is higher than in example 31.

Example 33

Hot Pressing with Textured Agglomerates:

Hexagonal boron nitride powder with a primary particle size $d_{50}$ of 15 µm (measured using Mastersizer 2000, Malvern, wet measurement; from ESK Ceramics GmbH & Co. KG, BORONID 815) is fed continuously by means of a vibratory chute and is roll-compacted with a throughput of 5 kg/h as in example 1. The resultant material is then compacted for a second time with a throughput of 7.9 kg/hand for a third time with a throughput of 15.9 kg/h. The granulated material obtained in the form of flakes with a thickness of 200 µm is then dedusted by sieving to <100 µm, with 12 wt. % of the material obtained in roll compaction being separated as fines fraction. The flakes obtained have a size of 1-3 cm.

The flake-shaped agglomerates produced in this way were placed in a hot-pressing die (7.2 cm diameter, 12 cm height) Instead of the usual <250 g BN powder, more than 500 g of material could be filled in the same volume of the hot-pressing die. Then hot-pressing was carried out at a temperature of 1800° C., a pressure of 23 MPa and with a holding time of one hour. The hot-pressed boron nitride sintered compact obtained has a density of 2.09 g/cm$^3$ and has a very pronounced texture. The texture index determined on the hot-pressed sintered compact on a sample prepared perpendicularly to the direction of hot pressing with the dimensions 2 mm×1 cm×1 cm is 118.3. For comparison, the texture index determined on known hot-pressed boron nitride sintered compacts (for example MYCROSINT S, ESK Ceramics GmbH &Co. KG) has values of up to about 1.8.

Example 34

Hot Pressing with Textured Agglomerates and Turbostratic Boron Nitride:

As in example 33, textured agglomerates were produced, but hexagonal boron nitride powder with a primary particle size $d_{50}$ of 3 µm was used for roll compaction. The textured agglomerates with a size of 1-3 cm were then mixed with turbostratic boron nitride in the ratio 1:1, filled in a hot-pressing die (7.2 cm diameter, 12 cm height) and hot-pressed at a temperature of 1800° C., a pressure of 23 MPa and a holding time of 90 minutes. The hot-pressed boron nitride sintered compact obtained has a density of 2.14 g/cm$^3$. The 4-point-bending breaking strength determined on this sintered compact is 153 MPa, and the Brinell hardness is 49.8. For comparison, a hot-pressed sintered compact of comparable size was produced from boron nitride powder with a primary particle size $d_{50}$ of 3 µm in the same hot-pressing conditions. The bending breaking strength determined on this comparative sintered compact is 75 MPa at a density of 2.03 g/cm$^3$ and a Brinell hardness of 31.8.

Example 35

Hot Pressing with Textured Agglomerates:

Hexagonal boron nitride powder with a primary particle size $d_{50}$ of 3 µm (measured using Mastersizer 2000, Malvern, wet measurement) and a $B_2O_3$ content of 3 wt. % is fed continuously by means of a vibratory chute and is roll-compacted with a throughput of 4 kg/h as in example 1. The resultant material is then compacted for a second time with a throughput of 5.8 kg/hand for a third time with a throughput of 7 kg/h. The granulated material obtained in the form of flakes with a thickness of 200 µm is then dedusted by sieving to <100 µm, with 4 wt. % of the material obtained in roll compaction being separated as fines fraction. The flakes obtained have a size of 1-3 cm.

The flake-shaped agglomerates produced in this way were placed in a hot-pressing die (7.2 cm diameter, 12 cm height). Then hot-pressing was carried out at a temperature of 1800° C., a pressure of 23 MPa and with a holding time of one hour. The hot-pressed boron nitride sintered compact obtained has a density of 2.11 g/cm$^3$. The texture index on the hot-pressed sintered compact on a sample prepared perpendicularly to the direction of hot pressing with the dimensions 2 mm×1 cm×1 cm is 8.9.

Comparative Example 1

Untextured Agglomerates

Hot-pressed boron nitride (MYCROSINT S, ESK Ceramics GmbH & Co. KG) is precrushed using a jaw crusher and then broken up in a hammer mill (with 4 mm hole sieve insert). Sieving gives fractions in the desired range, i.e. 100-210 µm and 210-350 µm.

The value determined on the 100-210 µm agglomerate fraction for the texture index and the specific surface according to the BET method (nitrogen adsorption, Beckmann-Coulter) are shown in Table 1.

Comparative Example 1 I)

Untextured Agglomerates as Filler in Epoxide, Degree of Filling 43%, Random Arrangement:

53 g of the agglomerates from comparative example 1 (fraction 100-210 µm, with average agglomerate size $d_{50}$ of 170 µm) is processed according to example 24 I) A), a thermal conductivity sample is prepared and the thermal conductivity is measured (Table 3).

Comparative Example 1 II)

Untextured Agglomerates as Filler in Epoxide, Degree of Filling 43%, Sample Preparation "Through Plane"

53 g of the agglomerates from comparative example 1 (fraction 100-210 µm, with average agglomerate size $d_{50}$ of 170 µm) is processed according to example 19 to a solidified plate, a thermal conductivity sample is prepared and the through-plane thermal conductivity is measured (Table 3).

Comparative Example 1 III)

Untextured Agglomerates as Filler in Epoxide, Degree of Filling 43%, Sample Preparation "in Plane"

53 g of the agglomerates from comparative example 1 (fraction 100-210 µm, with average agglomerate size. $d_{50}$ of 170 µm) is processed according to example 19.

From the solidified plate from comparative example 1 II), 5 lamellae with a size of 10×10×2 mm³ are prepared. These are processed as in example 20 to an in-plane thermal conductivity sample and the thermal conductivity is measured in-plane (Table 3).

The in-plane value determined is only slightly higher than the through-plane value from comparative example 1 II).

Comparative Example 2

Untextured Agglomerates

Boron nitride agglomerates are produced according to example 3 of WO 2005/021428 A1.

For this, hexagonal boron nitride powder with a primary particle size $d_{50}$ of 1 µm (measured using Mastersizer; from ESK Ceramics GmbH & Co. KG, BORONID SCP1) is compacted cold-isostatically at 1350 bar. The resultant compacts are precrushed and broken up by means of sieving and sieving-trituration into a fraction of 100-210 µm. The granules are heat-treated under nitrogen at 1900° C. for 12 hours.

The resultant sinter cake of the granules is broken up again by sieving and sieving-trituration into a fraction of 100-210 µm. The average agglomerate size $d_{50}$ measured by laser diffraction (dry measurement, Mastersizer 2000, Malvern) is 150 µm.

The value determined on the 100-210 µm agglomerate fraction for the texture index and the specific surface according to the BET method (nitrogen adsorption, Beckmann-Coulter) are shown in Table 1.

Comparative Example 2 I)

Untextured Agglomerates as Filler in Epoxide, Degree of Filling 43%, Random Arrangement:

53 g of the agglomerates from comparative example 2 is processed according to example 17 I) A), a thermal conductivity sample is prepared and the thermal conductivity is measured (Table 3).

Comparative Example 2 II)

Untextured Agglomerates as Filler in Epoxide, Degree of Filling 43%, Sample Preparation "Through Plane"

53 g of the agglomerates from comparative example 2 is processed according to example. 26 to a solidified plate, a thermal conductivity sample is prepared and the through-plane. thermal conductivity is measured (Table 3).

Comparative Example 2 III)

Untextured Agglomerates as Filler in Epoxide, Degree of Filling 43%, Sample Preparation "in Plane"

From the solidified plate from comparative example 2 II), 5 lamellae with a size of 10×10×2 mm³ are prepared. These are processed as in example 27 to give an in-plane thermal conductivity sample and the thermal conductivity is measured in-plane (Table 3)

The in-plane value determined is only slightly higher than the through-plane value from comparative example 2 II).

Comparative Example 3

53 g of a powder mixture of 10% Boronid SCP1 (boron nitride powder with average particle size of 1 µm, ESK Ceramics GmbH &Co. KG) and 90% Boronid S15 (boron nitride powder with average particle size of 15 µm, ESK Ceramics GmbH &Co. KG) are processed as described in example 24 I) A), a thermal conductivity sample is prepared and the thermal conductivity is measured (Table 3)

TABLE 1

| Example | Texture index | BET [m2/g] | Aspect ratio |
|---|---|---|---|
| 7 I) A) | 1.6 | 16.65 | 1.8 |
| 7 I) B) | 2.3 | 18.43 | 3.3 |
| 7 I) C) | 2.9 | 18.63 | n.d. |
| 7 II) B) | 2.5 | 8.77 | 3.3 |
| 7 II) C) | 3.1 | 8.71 | 6.8 |
| 7 III) B) | 3.4 | 7.54 | 3.5 |
| 7 III) C) | 4.0 | 7.61 | 4.8 |
| 14 I) A) | 7.5 | 6.35 | n.d. |
| 14 I) B) | 16.4 | 7.19 | n.d. |
| 14 I) C) | 17.6 | 8.49 | 4.4 |
| 14 II) A) | 8.7 | 2.27 | n.d. |
| 14 II) B) | 22.1 | 2.26 | n.d. |
| 14 II) C) | 41.5 | 2.39 | 7.1 |
| 14 III) C) | 40.5 | 1.69 | 7.6 |
| 15 | 3.1 | 0.99 | n.d. |
| 16 | 6.1 | n.d. | n.d. |
| 17 | 7.7 | n.d. | n.d. |

TABLE 1-continued

| Example | Texture index | BET [m2/g] | Aspect ratio |
|---|---|---|---|
| Comparative example 1 | 1.4 | 2.79 | n.d. |
| Comparative example 2 | 1.5 | 6.76 | n.d. | n.d.: not determined

TABLE 2

| Example | Buoyancy density [g/cm³] | Density determined geometrically [g/cm³] |
|---|---|---|
| 19 | 2.24 | 2.11 |
| 20 | 2.18 | 2.04 |
| 21 | 2.15 | 2.00 |
| 22 | 2.05 | 1.92 |
| 23 | 2.14 | 2.05 |

TABLE 3

| Example | Filler | Thermal conductivity [W/m * K] |
|---|---|---|
| 24 I) A) | 7 I) A) | 1.06 |
| 24 I) B) | 7 I) B) | 1.35 |
| 24 I) C) | 7 I) C) | 1.03 |
| 24 II) A) | 7 II) A) | 1.35 |
| 24 II) B) | 7 II) B) | 1.20 |
| 24 II) C) | 7 II) C) | 1.67 |
| 24 III) A) | 7 III) A) | 3.15 |
| 24 III) B) | 7 III) B) | 2.13 |
| 24 III) C) | 7 III) C) | 2.26 |
| 25 | 14 III) C) | 1.90 |
| 26 | 7 III) C) | 1.74 |
| 27 | 7 III) C) | 2.59 |
| 28 | 3% SCPl, 24% Boronid S15, 73% agglomerates from example 7 III) C) | 2.33 |
| 29 | 3% SCPl, 24% Boronid S15, 73% agglomerates from example 7 III) C) | 3.19 |
| 30 | 7 III) C) rounded | 2.32 |
| 31 | 17 | 1.80 |
| 32 | 14 III) C) | 2.40 |
| Comparative example 1 I) | Comparative example 1 | 1.26 |
| Comparative example 1 II) | Comparative example 1 | 1.15 |
| Comparative example 1 III) | Comparative example 1 | 1.24 |
| Comparative example 2 I) | Comparative example 2 | 2.26 |
| Comparative example 2 II) | Comparative example 2 | 2.02 |
| Comparative example 2 III) | Comparative example 2 | 2.17 |
| Comparative example 3 | 10% SCPl, 90% Boronid S15 | 1.15 |

The invention claimed is:

1. Boron nitride agglomerates, comprising lamellar, hexagonal boron nitride primary particles having an average particle size of 0.5 to 15 μm, in a binder free, flake-shape agglomerate formed with an essentially parallel alignment of the lamellae, the flake-shaped agglomerate having an average size $d_{50}$ up to 3 mm, and wherein a proportion of forming surface, relative to a total surface of the flake-shaped agglomerates, is at least 10%.

* * * * *

UNITED STATES PATENT AND TRADEMARK OFFICE
CERTIFICATE OF CORRECTION

PATENT NO. : 10,526,250 B2  
APPLICATION NO. : 16/201138  
DATED : January 7, 2020  
INVENTOR(S) : Martin Engler et al.

Page 1 of 1

It is certified that error appears in the above-identified patent and that said Letters Patent is hereby corrected as shown below:

In the Specification

<u>Column 8</u>  
Line 33, After "preferably" insert -- 1.8 --.

<u>Column 9</u>  
Line 16, After "diameter" insert -- * --.  
Line 17, After "side area" and insert -- = --.

<u>Column 18</u>  
Line 13, Delete "28 wt. % 100 μm." and insert -- 28 wt. % <100 μm. --, therefor.

Signed and Sealed this  
Fifth Day of January, 2021

Andrei Iancu  
*Director of the United States Patent and Trademark Office*